United States Patent
Biller

(10) Patent No.: US 9,321,445 B2
(45) Date of Patent: Apr. 26, 2016

(54) METHOD FOR OPERATING A HYDRAULIC SYSTEM AND BRAKE SYSTEM

(71) Applicant: Continental Teves AG & Co. oHG, Frankfurt (DE)

(72) Inventor: Harald Biller, Eschborn (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/382,831

(22) PCT Filed: Feb. 28, 2013

(86) PCT No.: PCT/EP2013/054059
§ 371 (c)(1),
(2) Date: Sep. 4, 2014

(87) PCT Pub. No.: WO2013/131806
PCT Pub. Date: Sep. 12, 2013

(65) Prior Publication Data
US 2015/0027113 A1    Jan. 29, 2015

(30) Foreign Application Priority Data

Mar. 6, 2012   (DE) .......................... 10 2012 203 499
Feb. 26, 2013  (DE) .......................... 10 2013 203 172

(51) Int. Cl.
*B60T 13/74*  (2006.01)
*B60T 7/04*   (2006.01)
(Continued)

(52) U.S. Cl.
CPC ............... *B60T 13/741* (2013.01); *B60T 7/042* (2013.01); *B60T 8/326* (2013.01); *B60T 8/3655* (2013.01);
(Continued)

(58) Field of Classification Search
None
See application file for complete search history.

(56) References Cited

U.S. PATENT DOCUMENTS 8,651,586 B2   2/2014  Wuerth
8,770,673 B2   7/2014  Wuerth
(Continued)

FOREIGN PATENT DOCUMENTS

DE   102008002348   12/2009
DE   102008041760   12/2009
(Continued)

OTHER PUBLICATIONS

International Search Report for PCT/EP2013/054059 mailed Aug. 6, 2013.
(Continued)

*Primary Examiner* — Thomas Tarcza
*Assistant Examiner* — Garrett Evans
(74) *Attorney, Agent, or Firm* — RatnerPrestia

(57) ABSTRACT

A method for operating a hydraulic system with a plurality of consumers an electrically controllable pressure supply device and an electrically actuable inlet valve, per consumer, which inlet valve is arranged between the pressure supply device and the consumer, wherein a pressure/volume relationship is predefined or determined for each consumer, wherein each consumer is assigned to a first group or a second group of consumers, wherein the first group of consumers includes at least one consumer, and wherein, in order to set predefined consumer-specific setpoint pressures, the first group of consumers is connected via the respectively opened inlet valve to the pressure supply device, and the inlet valves of the consumers of the second group are closed, wherein the inlet valve of a single, selected consumer of the second group is opened while being regulated to build up a pressure, and a brake system for motor vehicles.

20 Claims, 2 Drawing Sheets

(51) Int. Cl.
  B60T 13/14      (2006.01)
  B60T 13/66      (2006.01)
  B60T 13/68      (2006.01)
  B60T 17/02      (2006.01)
  B60T 8/88       (2006.01)
  B60T 8/32       (2006.01)
  B60T 8/36       (2006.01)
  B60T 8/40       (2006.01)
  F15B 7/00       (2006.01)

(52) U.S. Cl.
  CPC ............ *B60T 8/4081* (2013.01); *B60T 8/885* (2013.01); *B60T 13/146* (2013.01); *B60T 13/662* (2013.01); *B60T 13/686* (2013.01); *B60T 13/745* (2013.01); *B60T 17/02* (2013.01); *F15B 7/003* (2013.01); *B60T 2270/402* (2013.01); *B60T 2270/404* (2013.01); *F15B 2211/20515* (2013.01); *F15B 2211/25* (2013.01); *F15B 2211/3059* (2013.01); *F15B 2211/30505* (2013.01); *F15B 2211/3144* (2013.01); *F15B 2211/31529* (2013.01); *F15B 2211/327* (2013.01); *F15B 2211/6309* (2013.01); *F15B 2211/6333* (2013.01); *F15B 2211/6653* (2013.01); *F15B 2211/7142* (2013.01); *F15B 2211/783* (2013.01)

(56) References Cited

U.S. PATENT DOCUMENTS

2007/0252098 A1* 11/2007 Schmidt ................ B60T 8/36
                                                251/129.01
2009/0037065 A1* 2/2009 Burkhard ................ B60T 8/36
                                                701/71
2011/0241419 A1 10/2011 Ohkubo
2012/0013173 A1  1/2012 Leiber
2012/0118682 A1* 5/2012 Murayama ............ B60T 13/166
                                                188/152
2012/0169112 A1  7/2012 Jungbecker
2013/0119752 A1  5/2013 Roll
2013/0207452 A1  8/2013 Gilles

FOREIGN PATENT DOCUMENTS

| DE | 102009008944 | 8/2010 |
| DE | 102010020002 | 11/2011 |
| DE | 102011077329 | 1/2012 |
| EP | 1873028 | 1/2008 |
| EP | 1997701 | 12/2008 |
| WO | 2005054028 | 6/2005 |
| WO | 2011029812 | 3/2011 |

OTHER PUBLICATIONS

German Search Report mailed Oct. 22, 2013 in counterpart German Application No. 10 2013 203 172.6, including partial translation.

Written Opinion of the International Searching Authority for International Application No. PCT/EP2013/054059, including an English translation.

* cited by examiner

METHOD FOR OPERATING A HYDRAULIC SYSTEM AND BRAKE SYSTEM

CROSS REFERENCE TO RELATED APPLICATIONS

This application is the U.S. National Stage Application of PCT International Application No. PCT/EP2013/054059, filed Feb. 28, 2013, which claims priority to German Patent Application No. 10 2012 203 499.4, filed Mar. 6, 2012 and German Patent Application No. 10 2013 203 172.6, filed Feb. 26, 2013, the contents of such applications being incorporated by reference herein.

FIELD OF THE INVENTION

The invention relates to a method for operating a hydraulic system and also a brake system.

BACKGROUND OF THE INVENTION

"Brake by wire" brake systems are increasingly being used in motor vehicle technology. Brake systems of this type often comprise an electrically controllable pressure providing device in addition to a master brake cylinder that can be actuated by the driver of the vehicle and the wheel brakes or the master brake cylinder are actuated in the "brake by wire" operating mode by means of said pressure providing device.

The international patent application WO 2011/029812 A1, which is incorporated by reference herein, discloses a "brake by wire" brake system having a master brake cylinder that can be actuated by a brake pedal, having a travel simulator and a pressure providing device. The wheel brakes are influenced by pressure in a "brake by wire" operating mode by means of the pressure providing device. In a fallback operating mode, the wheel brakes are influenced by pressure by means of the master brake cylinder that can be actuated by the brake pedal. Detailed explanations regarding setting the desired braking pressures at the individual wheel brakes are not provided.

SUMMARY OF THE INVENTION

An aspect of the present invention provides a method for operating a hydraulic system and also to provide a brake system and said method or brake system are to render it possible to regulate the pressures of the consumer in a finely metered manner.

An aspect of the invention is based on the idea that a pressure-volume ratio is predetermined or determined, in other words is known, for each consumer. Each consumer is allocated to a first group or a second group of consumers, wherein the first group of consumers comprises at least one consumer. For the purpose of setting pre-determined, consumer-specific desired pressures, the first group of consumers is or will be connected by way of in each case the opened inlet valve to the pressure providing device so that the first group is influenced by the system pressure of the pressure providing device and the inlet valves of the consumers of the second group are or will be closed, wherein the inlet valve of a single selected consumer of the second group is opened in a regulated manner for the purpose of building up a pressure. That means that at any point in time at most the inlet valve of a single, selected consumer of the second group is opened in a regulated manner for the purpose of building up a pressure.

It is preferred that the invention concerns a brake system, wherein the system pressure corresponds to the brake system pressure of the pressure providing device.

In order to set the desired pressure of the selected consumer as precisely as possible, it is preferred that the inlet valve of the selected consumer is opened in a regulated manner, wherein the inlet valve is regulated by controlling the volume. For the purpose of regulating the inlet valve it is particularly preferred that the pressure-volume ratios of the consumers are evaluated in order to calculate the required pressure medium volume of the selected consumer as precisely as possible.

The term "a pressure-volume ratio" of a consumer is understood to mean in accordance with the invention the pressure medium requirement of the consumer or rather the volume to be received by the consumer in dependence upon the pressure, in particular braking pressure, or in other words the ratio between the pressure and the pressure medium requirement or rather volume requirement of the consumer. In the case of a brake system, the pressure corresponds to a braking pressure that in turn corresponds to a braking torque.

A pressure-volume ratio is predetermined or determined for each consumer. A (common) pressure-volume ratio can be predetermined for all consumers or a group of consumers, or consumer-specific pressure-volume ratios can be predetermined. Advantageously, one or multiple pressure-volume ratios can be determined in advance with the aid of the pressure providing device in the system or rather brake system and said pressure-volume ratios are then drawn upon hereinunder for the method in accordance with the invention.

The system or rather brake system preferably comprises an inlet valve that has been converted to analog or that is controlled in an analog manner in order to achieve a precise pressure setting.

The method in accordance with the invention is preferably implemented in a system or rather brake system in which a non-return valve that opens in the direction of the pressure providing device is connected in each case in parallel to the inlet valves. In order to inhibit the outflow of pressure medium from the consumers with closed or temporarily closed inlet valves to the pressure providing device, the system pressure that is provided by the pressure providing device is preferably at all times higher than the highest pressure in a consumer of the second group.

In accordance with a preferred development of the invention, the inlet valve of the selected consumer is regulated with reference to the pressure medium volume that is output or received by the pressure providing device, and with reference to the system pressure and pressure volume ratios of consumers. It is particularly preferred that the pressure-volume ratio of the selected consumer and one or multiple pressure volume ratios of one or multiple consumers of the first group are drawn upon. As a consequence, the pressure medium volume that is received by the selected consumer can be balanced in a precise manner.

The prevailing pressure of the selected consumer is preferably determined by means of the pressure-volume ratio of the selected consumer from a calculated pressure medium volume requirement of the selected consumer. It is particularly preferred that the volume of pressure medium required by the selected consumer is calculated as the difference between one of the pressure medium volumes that is output or received by the pressure providing device, and a group pressure medium volume that is received or output by one or multiple consumers of the first group. The pressure medium volume that is output or received by the pressure providing device is preferably directly or indirectly determined by means of a measuring device (for example a sensor), in other words directly or indirectly measured. The group pressure medium volume is advantageously calculated with reference to the system pressure and one or multiple pressure volume ratios of one or multiple consumers of the first group.

In accordance with a preferred embodiment of the method in accordance with the invention, the consumers of the second group in which pressure is to be built up are considered chronologically one after the other as selected consumers whose inlet valve is opened in a regulated manner.

It is preferred in the case of the consumers of the second group in which pressure is to be built up that pressure is built up to a desired pressure and said desired pressure is lower than the desired pressure of the first group.

As soon as the prevailing pressure of the selected consumer, said pressure being advantageously calculated as mentioned above, has achieved the predetermined desired pressure for the selected consumer, it is preferred that the inlet valve of the selected consumer is closed so that pressure can be built up at another consumer of the second group, selected as the next consumer, by means of opening the inlet valve in a regulated manner.

It is preferred that each consumer is allocated to a first group or a second group of consumers for one time interval. In time intervals that follow one another, the consumers are then advantageously allocated either to the first or the second group. It is particularly preferred that the distribution in time intervals and the respective allocation is dependent upon the temporal curves of the predetermined, consumer-specific desired pressures.

The first group of consumers that is or will be connected to the pressure providing device is preferably formed by means of the consumers with the highest desired pressure. All the remaining consumers belong to the second group. The second group of consumers consequently comprises the consumer or consumers in which pressure is to be built up to a lower pressure level than the highest desired pressure. Furthermore, the second group of consumers can comprise one or multiple consumers in which the pressure is maintained or decreased.

Advantageously, time intervals are determined corresponding to the temporal curves of the consumer-specific desired pressures and in said time intervals in each case one or multiple same consumers have the highest desired pressure or the highest desired pressure curve and therefore belong to the first group.

It is preferred that in the first group of consumers, the curve of the pre-determined desired pressure curve is set by means of regulating the pressure providing device. Since one or multiple consumers of the first group is or are connected to the pressure providing device by way of one or multiple opened inlet valves, the system pressure of the pressure providing device is equal to the pressure in one or multiple consumers of the first group.

It is preferred that the consumer-specific desired pressures are predetermined by a higher ranking regulator. It is particularly preferred that in this case said regulator is an electronic brake force proportioning regulator, an ABS regulator (ABS: Anti-lock brake system), a driving dynamics regulator, for example ESP regulator (ESP: electronic stability program), or a regulator for the purpose of implementing a regenerative braking operation.

It is preferred that the inlet valves further convey the respective pressures in the non-controlled state, in other words the inlet valves are embodied as open when there is no pressure flow.

The pressure medium volume that is output or required by the pressure providing device is preferably determined by means of a travel determining device or location determining device that is arranged on or in the pressure providing device.

In accordance with a further development of the invention, the system or brake system comprises a pressure sensor for determining the system pressure or brake system pressure that is provided by the pressure providing device.

It is preferred that the pressure providing device is formed by means of a cylinder-piston arrangement whose piston can be actuated by means of an electromechanical actuator. In this case, the pressure medium volume that is output or received by the pressure providing device is advantageously determined by means of a travel determining device or a location determining device and said device determines a value that characterizes a position or location of the piston. As a consequence, it is possible to set a precise pressure and also to determine the pressure medium volume that is output and or received.

Furthermore, it is preferred that the system or rather brake system comprises, for each consumer, for example a wheel brake, an electrically controllable outlet valve, advantageously for the purpose of connecting the consumer to the pressure medium storage container. It is particularly preferred that the outlet valves are in a blocked state in the non-controlled state (closed when there is no pressure flow).

An aspect of the invention also relates to a brake system for the purpose of implementing a method in accordance with the invention.

It is preferred that the method is implemented in a brake system for motor vehicles having one or multiple braking circuits and in said brake system each braking circuit is connected to a master brake cylinder by way of a hydraulic connecting line having a cut-off valve that is advantageously open when there is no pressure flow and each braking circuit is connected to the pressure providing device by way of a further hydraulic connecting line having a sequence valve that is advantageously closed when there is no pressure flow.

It is preferred that the brake system is a brake system for motor vehicles that can be controlled in a so-called "brake by wire" operating mode both by the driver of the vehicle and also independently of the driver of the vehicle, is preferably operated in the "brake by wire" operating mode and can be operated in at least one fallback operating mode in which only the operation by means of the driver of the vehicle is possible.

The brake system preferably comprises a pedal travel simulator that conveys a comfortable brake pedal sensation to the driver of the vehicle in the "brake by wire" operating mode. The pedal travel simulator is particularly preferably embodied in a hydraulic manner and is or can be connected to the master brake cylinder. The pedal travel simulator is advantageously embodied in such a manner that it can be switched on or off by means of a simulator release valve.

BRIEF DESCRIPTION OF THE DRAWINGS

Further preferred embodiments of the invention are evident in the dependent claims and the description hereinunder with reference to a figure.

In the drawings

DETAILED DESCRIPTION OF THE PREFERRED EMBODIMENTS

Figure 1:
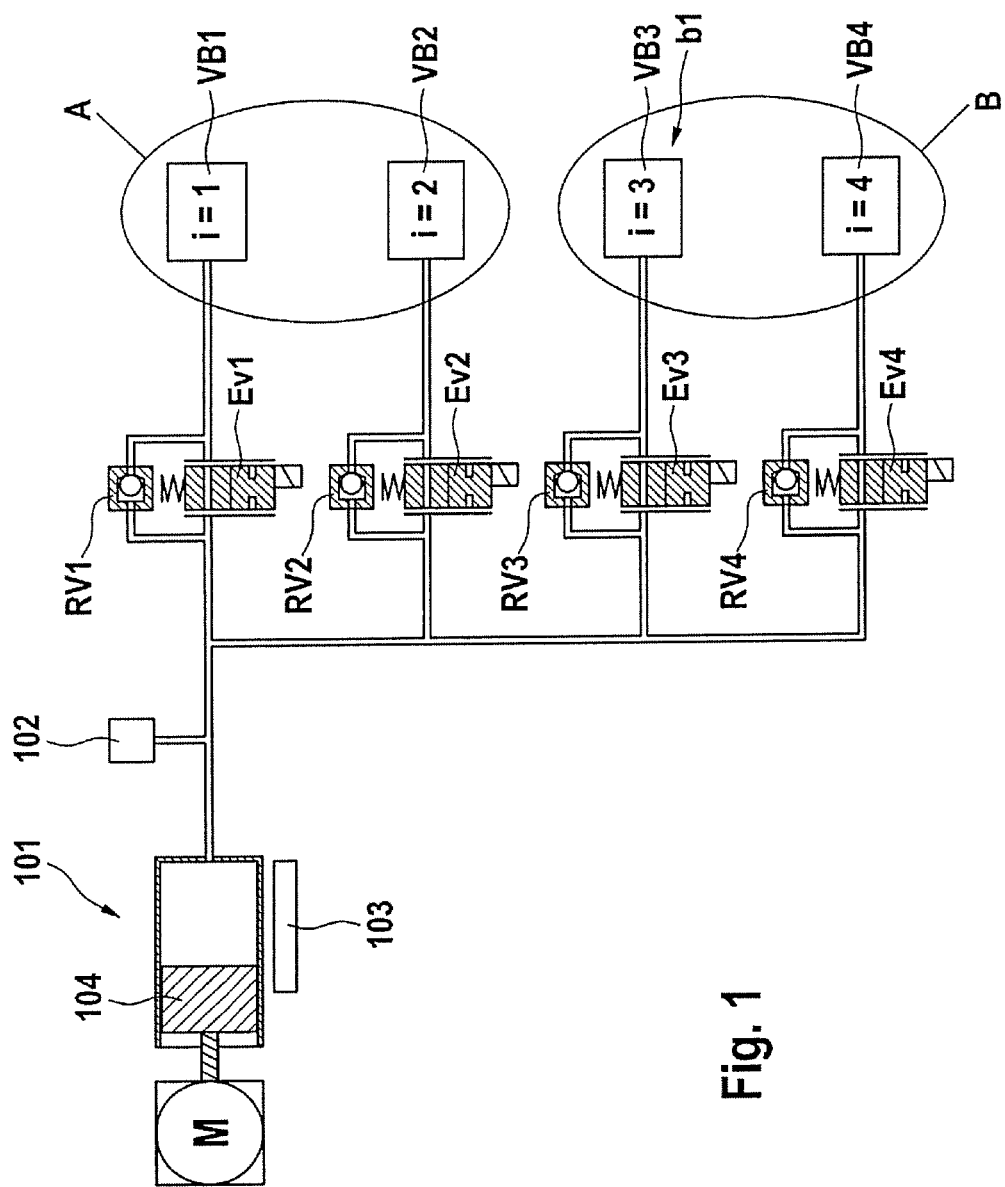
FIG. 1 schematically illustrates a brake system in accordance with the example for the purpose of implementing a method in accordance with the invention, and FIG. 2 schematically illustrates a brake system for motor vehicles in accordance with the example.

FIG. 1 is a detailed schematic illustration of a hydraulic brake system in accordance with the example for the purpose of implementing a method in accordance with the invention. The brake system comprises multiple consumers VBi with i=1 to N and said consumers can be actuated in a hydraulic manner, wherein four consumers VBi with i=1 to 4 are illustrated in accordance with the example and said brake system comprises an electrically controllable pressure providing device 101 and the consumers VBi are connected to said pressure providing device by way of in each case an electrically controllable inlet valve EVi (with i=1 to 4). Each inlet valve EVi is a parallel connected non-return valve RVi (with i=1 to 4) that opens in the direction of the pressure providing device 101. The pressure $P_i$ in a consumer VBi can therefore not exceed the pressure P in the pressure providing device 101.

In accordance with the example, the pressure providing device 101 is formed by means of a cylinder piston arrangement having an electromechanical actuator.

The pressure providing device 101 can be operated in a regulated manner by means of an electronic control and regulating unit that is not illustrated. Said control and regulating unit is also embodied for the purpose of controlling the inlet valve EVi.

In accordance with the example, the inlet valves Evi are open when there is no pressure flow and are embodied as valves that have been converted to analog or are controlled in an analog manner.

In accordance with the example, the brake system further comprises a pressure sensor 102 by means of which the brake system pressure P that is provided by the pressure providing device 101 can be measured, and also a travel sensor 103 for the purpose of determining the position/location of the piston 104 of the pressure providing device 101. The pressure medium volume V that is output or received by the pressure providing device 101 can be determined with reference to the change of the position/location of the piston 104. Other sensors for the purpose of determining a characteristic value for the position/location of the piston 104 of the pressure providing device 101 are feasible, for example a rotor location sensor for the purpose of determining the rotor position of an electric motor M of the pressure providing device 101.

FIG. 1 illustrates the inlet valves in their position when there is no pressure flow, in other words prior to the commencement of regulating the braking pressures in a consumer-specific manner. A method in accordance with the example is to be further explained with reference to FIG. 1.

It is understood that the pressure value characteristic lines $F_i$ of the individual consumer VBi are known. It is feasible that for two or more consumers in each case the functionally identical pressure volume characteristic line can be assumed, however it is advantageous to know the consumer-specific pressure-volume characteristic lines for the purpose of precisely setting the braking pressures of the consumer. The pressure-volume characteristic lines $F_i$ can be predetermined for example in the control and regulating unit. However, the pressure volume characteristic lines $F_i$ can also be determined or rather measured with the aid of the pressure providing device 101 and the inlet valves EVi by means of the brake system itself and can then be stored for example in the control and regulating unit. Furthermore, it is understood that the target (time) desired pressure curves $P_i^{desired}$ (also described as $P_i^{desired}(t)$) are known or determined (in advance) for each consumer VBi over a time interval $\Delta T$. These consumer-specific desired pressures $P_i^{desired}$ can for example be predetermined by a higher ranking regulator, such as by way of example an ABS regulator, a driving dynamics regulator or a regulator for the purpose of implementing a regenerative braking process.

The consumers VBi are all allocated to a first group A or a second group B of consumers. The first group A of consumers is formed by the consumers whose target desired pressure at a respective point in time or rather for a respective time interval $\Delta t_n$ is the highest desired pressure $P_A^{desired}$. As a result of selecting the time interval as sufficiently small, it is possible to establish a group A of this type in each considered time interval $\Delta t_n$. The first group A can also comprise a single consumer. The remaining consumers belong to the second group B of consumers.

In accordance with the example, the consumers VB1 and VB2 belong to the first group A and the consumers VB3 and VB4 belong to the second group B (see FIG. 1) for a defined time interval $\Delta t_n$.

The inlet valves EV1, EV2 of the first group A of consumers are or rather will be opened. The target pressure curve $P_A^{desired}(t)$ in the first group A of consumers is regulated by means of the pressure providing device 101. In other words, the inlet valves EV1, EV2 of the first group A of consumers remain open in the considered time interval $\Delta t_n$ in which these consumers VB1, VB2 have the highest desired pressure $P_A^{desired}$ of all the consumers VBi and a build-up of pressure or rather a decrease in pressure in the consumers VB1, VB2 is set by means of the pressure providing device 101, for example by means of the piston 104 of the pressure providing device 101 traveling forwards or backwards. The pressure P in the pressure providing device 101 is identical to the pressure $P_A$ in the consumers EV1, EV2 of the first group A in the sense of an entire pressure equalization between one or multiple consumers of the group A and the pressure providing device.

The inlet valves EV3, EV4 of the second group B of consumers are or rather will be initially closed. The inlet valves of consumers of the second group B, in which the braking pressure is to be maintained or decreased, remain closed. The second group of consumers B comprises one or multiple consumers in which a build-up of pressure to a lower pressure level (lower than $P_A^{desired}$) is targeted or predetermined (hereinunder described as sub-group B), thus in each case in an individual consumer of these consumers that is described as the selected consumer b1, pressure is built up by means of opening the corresponding inlet valve in a regulated manner, wherein in the case of multiple consumers, the pressure is built up sequentially at the different consumers. The pressure is built up in the selected consumer b1 using the known pressure-volume characteristic lines $F_i$.

In accordance with the example, it is assumed that in the consumers VB3 and VB4 a pressure is to be built up to a lower pressure level, in other words the sub-group B corresponds in accordance with the example to the group B. If the second group B comprises consumers in which the braking pressure is to be maintained or decreased, the sub-group B would accordingly be a subset of the second group B. Initially, the consumer VB3 is selected as the selected consumer VBb1, in other words b1=3. The inlet valve EVb1 is only opened in a regulated manner for the selected consumer b1 of the second group B so that a metered volume flow is provided by the pressure providing device 101 to the selected consumer VBb1. The volume V is determined or rather measured and said volume is output (V>0) or received (V<0) by the pressure providing device 101.

The pressure medium volume $V_A$ that the first group A receives ($V_A>0$) or outputs ($V_A<0$), the so-called group pressure medium volume, is calculated from the pressure curve $P_A(t)$ in the first group A of consumers (VB1 and VB2) and from the corresponding pressure volume characteristic lines $F_1$ and $F_2$. The pressure curve $P_A(t)$ in the first group A of consumers corresponds to the pressure curve P(t) in the pressure providing device 101 and can be measured by means of the pressure sensor 102.

The pressure medium volume $V_{b1}{}^{up}$ that the selected consumer b1 of the second group B receives (required pressure medium volume $V_{b1}{}^{up}$) is determined from the difference between the volume V and the group pressure medium volume $V_A$:

$$V_{b1}{}^{up}=V-V_A$$

The prevailing pressure $P_{b1}$ in the selected consumer b1 of the second group B is calculated from the pressure medium requirement volume $V_{b1}{}^{up}$ by means of the corresponding pressure volume characteristic line $F_{b1}$.

After a pre-controlled process of controlling the inlet valve EVb1, or (regulated) if the prevailing pressure $P_{b1}$ of the selected consumer b1=3 has achieved the desired pressure $P_{b1}{}^{desired}$, the inlet valve EVb1 of the selected consumer is closed. Then, in accordance with the corresponding, above described method, the pressure in another consumer of the sub-group B (in other words in a consumer of the second group B in which pressure is to be built up to a lower pressure level), in accordance with the example, the consumer VB4, in other words the consumer VB4 is selected as the next selected consumer VBb1, in other words b1=4. The desired pressure is thus built up chronologically one after the other in all consumers of the sub-group B.

It is not necessary to use the consumers of the sub-group B in a fixed sequence in turn. The consumer of the sub-group B in which the pressure is to be built up next can be freely selected by way of example in dependence upon the deviation between the desired and the achieved pressure.

Errors in the metered process of opening and closing the inlet valves of one or multiple consumers of the sub-group B in fact lead to errors in the pressure curve during the affected opening and closing process. However, the accuracy of the pressure information for the respective consumer is not affected by means of errors of this type, rather said accuracy depends only on the knowledge of the volume requirement and the volume balance. Errors of this type can therefore be compensated for in the next opening and closing process at the same consumer. The method can also indirectly learn the behavior of the inlet valves (in other words the ratio between control and volume flow.

In the case of the method in accordance with the example, the inlet valves of the first group A of consumers are kept open during a determined time interval $\Delta t_n$. Alternative methods are also feasible in which it is not provided that the inlet valves of the first group A of consumers are to be kept open. Advantageously depending upon each situation, the two methods can be used with their specific advantages.

It is preferred that the brake system is a regenerative brake system for a motor vehicle, wherein the pressure curve is part of a (for example recuperative) braking process in cooperation with the electrical drive. The first group A of consumers comprises the wheel brakes on the non-driven axle, the second group B comprises the wheel brakes on the driven axle, in which the braking pressure is to be inhibited in such a manner that it corresponds to the contribution of the electrical drive for the purpose of decelerating the vehicle.

Figure 2:
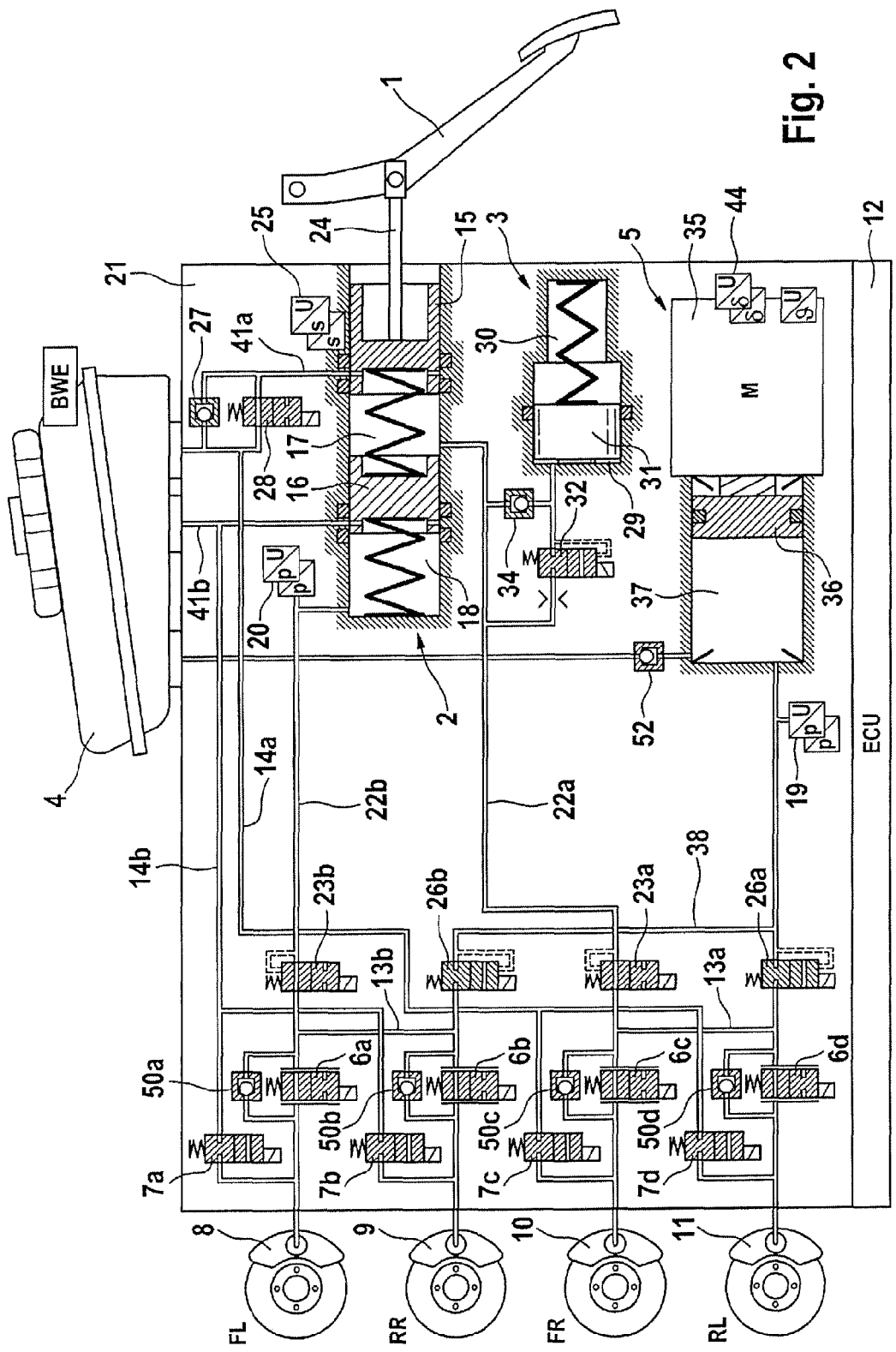

FIG. 2 schematically illustrates a brake system in accordance with the example for motor vehicles for the purpose of implementing a method in accordance with the invention. The brake system essentially comprises a hydraulic actuating unit 2 that can be actuated by means of an actuating pedal or rather brake pedal 1, a travel simulator or rather simulating device 3 that cooperates with the hydraulic actuating unit 2, a pressure medium storage container 4 that is allocated to the hydraulic actuating unit 2 and that is subjected to atmospheric pressure, an electrically controllable pressure providing device 5, an electronic control and regulating unit 12 and an electrically controllable pressure modulating device.

The pressure modulating device comprises in accordance with the example for each wheel brake 8, 9, 10, 11 of a motor vehicle (not illustrated), an inlet valve 6a-6d and an outlet valve 7a-7d that are connected together in pairs in a hydraulic manner by way of center connectors and are connected to the wheel brakes 8, 9, 10, 11. The input connectors of the inlet valves 6a-6d are supplied with pressures by means of braking circuit supply lines 13a, 13b and said pressures are derived in a "brake by wire" operating mode from a brake system pressure P that is present in a system pressure line 38 that is connected to a pressure chamber 37 of the electrically controllable pressure providing device 5. A non-return valve 50a-50d that is open towards the braking circuit supply lines 13a, 13b is connected in parallel to the inlet valves 6a-6d. In a fallback operating mode, the braking circuit supply lines 13a, 13b are influenced by pressure by way of hydraulic lines 22a, 22b with the pressures of the pressure chambers 17, 18 of the actuating unit 2. The output connectors of the outlet valves 7a-7d are connected in pairs by way of return lines 14a, 14b to the pressure medium storage container 4.

The hydraulic actuating unit 2 comprises in a housing 21 two pistons 15, 16 that are arranged one behind the other and that delimit the hydraulic chambers or rather pressure chambers 17, 18 that together with the pistons 15, 16 form a dual circuit master brake cylinder or rather a tandem master brake cylinder. The pressure chambers 17, 18 are connected on one end to the pressure medium storage container 4 by way of radial bore holes that are embodied in the pistons 15, 16 and also by way of corresponding pressure equalizing lines 41a, 41b, wherein said bore holes and pressure equalizing lines can be blocked by means of a relative movement of the pistons 17, 18 in the housing 21, and on the other end said pressure chambers are connected by means of the hydraulic lines 22a, 22b to the abovementioned braking circuit supply lines 13a, 13b, by way of which the inlet valve 6a-6d is connected to the actuating unit 2. A parallel connection of a diagnosis valve 28 that is open when there is no pressure flow (NO-normally open) to a non-return valve 27 that closes towards the pressure medium storage container 4 is contained in the pressure equalizing line 41a. The pressure chambers 17, 18 therefore receive return springs that are not further described and that position the pistons 15, 16 in a starting position in the case of a non-actuated master brake cylinder 2. A piston rod 24 couples the pivoting movement of the brake pedal 1 following a pedal actuation to the translation movement of the first (master cylinder) piston 15, whose actuating path is determined by a preferably redundantly embodied travel sensor 25. As a consequence, the corresponding piston travel signal is a measurement for the brake pedal actuating angle. Said piston travel signal represents the amount of braking force desired by the driver of the vehicle.

A cut-off valve 23a, 23b is arranged in each of the line sections 22a, 22b that are connected to the pressure chambers 17, 18 and said cut-off valve is embodied in each case as an electrically actuated valve that is preferably open when there is no pressure flow (NO-normally open). The hydraulic connection between the pressure chambers 17, 18 and the braking circuit supply lines 13a, 13b can be blocked by means of the cut-off valves 23a, 23b. A pressure sensor 20 that is connected to the line section 22b determines the pressure that builds up in the pressure chamber 18 as a result of a displacement of the second piston 16.

The travel simulator 3 is coupled to the master brake cylinder 2 in a hydraulic manner and is embodied by way of example as a stand-alone construction group that essentially comprises a simulator chamber 29, a simulator spring chamber 30 and also a simulator piston 31 that divides the two chambers 29, 30 from one another. The simulator piston 31 supports itself against the housing 21 by means of a resilient element (for example a spring) that is arranged in the simulator chamber 30 and said resilient element is advantageously pre-stressed. The simulator chamber 29 can be connected to the first pressure chamber 17 of the tandem master brake cylinder 2 by means of a simulator release valve 32 that can be actuated in an electrical manner. In the case of a pedal force being applied and the simulator release valve 32 being activated, pressure medium flows from the master brake cylinder pressure chamber 17 into the simulator chamber 29. A non-return valve 34 that is arranged in a hydraulic antiparallel manner with respect to the simulator release valve 32 renders it possible irrespective of the switching state of the simulator release valve 32 for the pressure medium to flow back in a greatly unhindered manner from the simulator chamber 29 to the master brake cylinder pressure chamber 17.

The electrically controllable pressure providing device 5 is embodied as a hydraulic cylinder piston arrangement or rather a single circuit electrohydraulic actuator whose piston 36 can be actuated by a schematically illustrated electric motor 35 by virtue of interconnecting a likewise schematically illustrated rotation translation transmission. The piston 36 delimits a pressure chamber 37. It is possible to draw pressure medium into the pressure chamber 37 as a result of a return of the piston 36 in the case of closed sequence valves 26a, 26b in that pressure medium can flow out of the pressure medium storage container 4 by way of a feeding valve 52 that is embodied as a non-return valve that is open in the flow direction towards the actuator into the actuator pressure chamber 37.

A sensor 44 is provided for the purpose of determining a characteristic value for the position/location of the piston 36 of the pressure providing device 5 and said sensor in accordance with the example is embodied as a rotor location sensor that is used to determine the rotor position of the electric motor 35. Other sensors are likewise feasible for example a travel sensor for the purpose of determining the position/location of the piston 36. It is possible to determine the pressure medium volume V that is output or received by the pressure providing device 5 with reference to the characteristic value for the position/location of the piston 36. A preferably redundantly embodied pressure sensor 19 is provided for the purpose of determining the brake system pressure P that is generated by the pressure providing device 5.

In a normal braking function of the brake system ("brake by wire" operating mode), the master brake cylinder 2 and therefore the driver of the vehicle are decoupled from the wheel brakes 8, 9, 10, 11 as a result of the closed cut-off valves 23a, 23b and the braking circuit supply lines 13a, 13b are connected to the pressure providing device 5 by way of the opened sequence valves 26a, 26b and said pressure providing device provides the system pressure for the purpose of actuating the wheel brakes 8, 9, 10, 11. The simulating device 3 is switched by means of the opened simulator release valve 32 so that the pressure medium volume that is conveyed into the master brake cylinder 2 by means of the driver actuating the brake pedal 1 is received by the simulating device 3 and the simulating device 3 conveys a familiar pedal sensation to the driver of the vehicle.

In the normal braking function of the brake system, the braking pressure of the wheel brakes 8-11 is regulated for individual wheels for the purpose of setting desired pressures $P_i^{desired}$ for individual wheels in accordance with the example by means of the electronic control and regulating unit 12. For this purpose a pressure-volume ratio for each consumer is stored in the control and regulating unit 12 or a pressure volume ratio is determined in advance for each consumer. In addition, in accordance with the example, the wheel-specific desired pressures $P_i^{desired}$ are determined in the control and regulating unit 12. A method in accordance with the invention can thus be implemented in the electronic control and regulating unit.

In a fallback operating mode of the brake system for example in the case of a failure of the electrical energy supply of the entire brake system, the simulating device 3 is switched off by means of the simulator release valve 32 that is closed when there is no pressure flow and the pressure providing device 5 is separated from the braking circuit supply lines 13a, 13b by means of the sequence valves 26a, 26b that are closed when there is no pressure flow. The master brake cylinder 2 is connected to the braking circuit supply lines 13a, 13b and therefore to the wheel brakes 8, 9, 10, 11 by way of the lines 22a, 22b having the cut-off valves 23a, 23b that are open when there is no pressure flow so that the driver of the vehicle can directly build up pressure in the wheel brakes 8, 9, 10, 11 by means of actuating the brake pedal 1.

The invention claimed is:

1. A method for operating a hydraulic brake system for motor vehicles, the brake system comprising:
   multiple consumers,
   an electrically controllable pressure providing device outputting a pressure medium volume for actuating the consumer, and
   an electrically controllable inlet valve for each consumer that is arranged between the pressure providing device and the consumer, the method comprising:
   allocating each consumer to a first group or a second group of consumers during a time interval ($\Delta t_n$), the first group of consumers comprising at least one consumer;
   connecting the first group of consumers to the pressure providing device by opening the inlet valve of each consumer in the first group of consumers so that each consumer in the first group receives a first desired pressure ($P_a^{desired}$) from the pressure providing device,
   closing the inlet valves of each consumer in the second group of consumers, and
   opening the inlet valve of a selected consumer of the second group in a regulated manner building up a second desired pressure lower than the first desired pressure.

2. The method as claimed in claim 1, wherein the inlet valve of the selected consumer of the second group is opened in a regulated manner for setting the second desired pressure ($P_{b1}^{desired}$) of the selected consumer, wherein the inlet valve is regulated by controlling the volume by evaluating pressure-volume ratios ($F_i$) of the consumers.

3. The method as claimed in claim 1, wherein a pressure medium volume (V) that is output or received by the pressure providing device and a system pressure (P) that is provided by the pressure providing device are determined, and wherein the inlet valve of the selected consumer is regulated with reference to the pressure medium volume (V) that is output or received by the pressure providing device, and with reference to the system pressure (P) and a pressure volume ratio of the selected consumer, and one or multiple pressure volume ratios of one or multiple consumers of the first group.

4. The method as claimed in claim 1, wherein a pressure volume ratio ($F_i$) is predetermined or determined for each consumer and for the time interval ($\Delta t_n$), and wherein a prevailing pressure ($P_{b1}$) of the selected consumer is determined by the pressure volume ratio ($F_{b1}$) of the selected consumer from a calculated pressure medium volume ($V_{b1}{}^{up}$) requirement of the selected consumer.

5. The method as claimed in claim 4, wherein the required pressure medium volume ($V_{b1}{}^{up}$) of the selected consumer is calculated as the difference between a pressure medium volume (V) that is output or received by the pressure providing device and a group pressure medium volume ($V_A$) that is received or output by one or multiple consumers of the first group.

6. The method as claimed in claim 5, wherein the group pressure medium volume ($V_A$) is determined with reference to a system pressure (P) that is provided by the pressure providing device and one or multiple pressure volume ratios of one or multiple consumers of the first group.

7. The method as claimed in claim 1, wherein the inlet valve of the selected consumer is closed if a prevailing pressure ($P_{b1}$) of the selected consumer has achieved the second desired pressure ($P_{b1}{}^{desired}$) that has been pre-determined for the selected consumer.

8. The method as claimed in claim 1, wherein the consumers of the second group in which pressure is to be built up are the selected consumer chronologically one after the other.

9. The method as claimed in claim 1, wherein the consumers are allocated in time intervals that follow one after the other either to the first group or the second group.

10. The method as claimed in claim 1, wherein the first group of consumers is formed by the consumer having in the time interval ($\Delta t_n$), the highest first desired pressure ($P_A{}^{desired}$).

11. The method as claimed in claim 1, wherein the predetermined first desired pressure ($P_A{}^{desired}$) is set in the first group of consumers by regulating the pressure providing device.

12. The method as claimed in claim 1, wherein a system pressure (P) that is provided by the pressure providing device is at all times higher than a highest pressure in a consumer of the second group.

13. A brake system for motor vehicles comprising:
multiple wheel brakes,
an electrically controllable pressure providing device outputting a pressure medium volume (V) for actuating the wheel brakes,
a master brake cylinder that can be actuated by a brake pedal and is connected to the wheel brakes in a separable manner,
an electrically controllable inlet valve for each wheel brake, said inlet valve being arranged between the pressure providing device and the wheel brake, and
an electronic control and regulating unit for controlling the electrically controllable pressure providing device and also the inlet valves,
wherein the electronic control and regulating unit is configured to:
allocate each wheel brake to a first group or a second group of wheel brakes during a time interval ($\Delta t_n$), the first group of wheel brakes comprising at least one wheel brake;
connect the first group of wheel brakes to the pressure providing device by opening the inlet valve of each wheel brake in the first group of wheel brakes so that each wheel brake in the first group receives a first desired pressure ($P_a{}^{desired}$) from the pressure providing device,
close the inlet valves of each wheel brake in the second group of wheel brakes, and
open the inlet valve of a selected wheel brake of the second group in a regulated manner for building up a second desired pressure lower than the first desired pressure.

14. The brake system for motor vehicles as claimed in claim 13, wherein said brake system comprises means that renders possible regenerative or recuperative braking at at least one wheel brake.

15. The method of claim 1, wherein the consumers are wheel brakes and the system pressure is a brake system pressure.

16. The brake system for motor vehicles as claimed in claim 14, wherein said brake system comprises a braking process in cooperation with an electrical drive of a motor vehicle that renders possible regenerative or recuperative braking at at least one wheel brake.

17. The method of claim 1, wherein a non-return valve that is open in the direction of the pressure providing device is connected in each case in parallel to the inlet valves.

18. The brake system of claim 13, wherein the electronic control and regulating unit is further configured to determine a pressure medium volume (V) that is output or received by the pressure providing device and a system pressure (P) that is provided by the pressure providing device.

19. The brake system of claim 13, wherein a non-return valve that is open in the direction of the pressure providing device is connected in each case in parallel to the inlet valves.

20. The brake system of claim 13, wherein the electronic control and regulating unit is further configured to determine a pressure volume ratio ($F_1$) for each wheel brake and for the time interval ($\Delta t_n$).

* * * * *